U S005748978A

United States Patent [19]

Narayan et al.

[11] Patent Number: 5,748,978
[45] Date of Patent: May 5, 1998

[54] BYTE QUEUE DIVIDED INTO MULTIPLE SUBQUEUES FOR OPTIMIZING INSTRUCTION SELECTION LOGIC

[75] Inventors: Rammohan Narayan; Thang M. Tran, both of Austin, Tex.

[73] Assignee: Advanced Micro Devices, Inc., Sunnyvale, Calif.

[21] Appl. No.: 650,940

[22] Filed: May 17, 1996

[51] Int. Cl.⁶ .............................. G06F 15/78; G06F 15/82
[52] U.S. Cl. .................. 395/800.23; 395/391; 395/392; 395/380
[58] Field of Search .............................. 395/800.23, 386, 395/391, 393, 392, 380, 800.24, 800.25

[56] References Cited

U.S. PATENT DOCUMENTS

| 4,044,338 | 8/1977 | Wolf | 365/49 |
|---|---|---|---|
| 4,453,212 | 6/1984 | Gaither et al. | 395/402 |
| 4,807,115 | 2/1989 | Torng | 395/391 |
| 4,858,105 | 8/1989 | Kuriyama et al. | 395/582 |
| 5,185,868 | 2/1993 | Tran | 355/393 |
| 5,226,126 | 7/1993 | McFarland et al. | 395/394 |
| 5,226,130 | 7/1993 | Favor et al. | 395/383 |
| 5,251,306 | 10/1993 | Tran | 395/393 |
| 5,499,204 | 3/1996 | Barrera et al. | 365/49 |
| 5,513,330 | 4/1996 | Stiles | 395/380 |
| 5,584,037 | 12/1996 | Papworth | 395/800.23 |
| 5,600,806 | 2/1997 | Brown et al. | 395/380 |
| 5,664,120 | 9/1997 | Afsar et al. | 395/393 |
| 5,668,985 | 9/1997 | Carbine et al. | 395/597 |
| 5,673,427 | 9/1997 | Brown et al. | 395/595 |

FOREIGN PATENT DOCUMENTS

| 0259095 | 3/1988 | European Pat. Off. . |
| 0381471 | 8/1990 | European Pat. Off. . |
| 0459232 | 12/1991 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," pp. 2-1 through 2-4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," Byte, Jan. 1996, 4 pages.

Primary Examiner—Larry D. Donaghue
Attorney, Agent, or Firm—Conley, Rose & Tayon; B. Noel Kivlin; Lawrence J. Merkel

[57] ABSTRACT

An apparatus for aligning variable byte length instructions to a plurality of issue positions is provided. The apparatus includes a byte queue divided into several subqueues. Each subqueue is maintained such that a first instruction in program order within the subqueue is identified by information stored in a first position within the subqueue, a second instruction in program order within the subqueue is identified by information stored in a second position within the subqueue, etc. When instructions from a subqueue are dispatched, remaining instructions within the subqueue are shifted such that the first of the remaining instructions (in program order) occupies the first position, etc. Instructions are shifted from subqueue to subqueue when each of the instructions within a particular subqueue have been dispatched. The information stored in one subqueue is shifted as a unit to another subqueue independent of the internal shifting of subqueue information. The subqueues are additionally configured to handle instructions which overflow from a first subqueue into a second subqueue. Information pertaining to the overflowing instructions is maintained in the last position within the first subqueue. The information is not shifted when other positions within the subqueue are shifted. In this manner, information regarding an overflowing instruction is again located in a limited number of positions.

20 Claims, 10 Drawing Sheets

Valid Combination of
Instructions within a Subqueue

| I2 | I1 | I0 |
|---|---|---|
| X | X | X |
| X | X | A |
| X | B | A |
| C | B | A |
| O | X | X |
| O | X | A |
| O | B | A |

| Initial State | | | Selected for Issue | Final State | | |
|---|---|---|---|---|---|---|
| I2 | I1 | I0 | | I2 | I1 | I0 |
| X | X | A | A | X | X | X |
| X | B | A | A | X | X | B |
| X | B | A | A,B | X | X | X |
| C | B | A | A | X | C | B |
| C | B | A | A,B | X | X | C |
| C | B | A | A,B,C | X | X | X |
| O | X | X | O | X | X | X |
| O | X | A | A | O | X | X |
| O | X | A | A,O | X | X | X |
| O | B | A | A | O | X | B |
| O | B | A | A,B | O | X | X |
| O | B | A | A,B,O | X | X | X |

98 points to row 2; 96 points to the table.

Fig. 6

|                   | Positions Analyzed        |                         |                         |
| ----------------- | ------------------------- | ----------------------- | ----------------------- |
| Issue Position    | Subqueue Zero 66A         | Subqueue One 66B        | Subqueue Two 66C        |
| 0                 | IØ, O                     | IØ, O                   | IØ                      |
| 1                 | I1, O                     | IØ, I1, O               | IØ, I1                  |
| 2                 | I2, O                     | IØ, I1, I2, O           | IØ, I1, I2              |

BYTE QUEUE DIVIDED INTO MULTIPLE SUBQUEUES FOR OPTIMIZING INSTRUCTION SELECTION LOGIC

BACKGROUND OF THE INVENTION

1. Field of the Invention

This invention is related to the field of microprocessors and, more particularly, to instruction selection and alignment mechanisms in microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 microprocessor specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

Unfortunately, having variable byte length instructions creates numerous problems for dispatching multiple instructions per clock cycle. Because the instructions have differing numbers of bytes, an instruction may begin at any memory address. Conversely, fixed length instructions typically begin at a known location. For example, a 4 byte fixed length instruction set has instructions which begin at 4 byte boundaries within memory (i.e. the two least significant bits are zeros for the memory addresses at which instructions begin).

In order to locate multiple instructions during a clock cycle, variable byte length instruction bytes fetched by the microprocessor may be serially scanned to determine instruction boundaries and thereby locate instructions which may be concurrently dispatched. Serial scanning involves a large amount of logic, and typically a large number of cascaded logic levels. For high frequency (i.e. short clock cycle time) microprocessors, large numbers of cascaded logic levels may be deleterious to the performance of the microprocessor. Some microprocessor designs employ pre-decoding to identify the beginning and end of instructions as the instructions are stored into an instruction cache within the microprocessor. Even with predecoding, locating and dispatching multiple instructions per clock cycle is a complex and often clock-cycle-limiting operation. Multiple levels of multiplexing are employed, and significant bussing between the multiplexors and the instruction bytes being dispatched is needed to allow arbitrary selection of bytes from the instruction bytes being examined for dispatch. The first instruction to be dispatched may be located anywhere within the instruction bytes. The second instruction to be dispatched is then located at the end of the first instruction, etc.

SUMMARY OF THE INVENTION

The problems outlined above are in large part solved by an apparatus for aligning variable byte length instructions to a plurality of issue positions in accordance with the present invention. The apparatus includes a byte queue divided into several subqueues. Each subqueue is maintained such that a first instruction in program order within the subqueue is identified by information stored in a first position within the subqueue, a second instruction in program order within the subqueue is identified by information stored in a second position within the subqueue, etc. When instructions from a subqueue are dispatched, remaining instructions within the subqueue are shifted such that the first of the remaining instructions (in program order) occupies the first position, etc. Instructions are shifted from subqueue to subqueue when each of the instructions within a particular subqueue have been dispatched. The information stored in one subqueue is shifted as a unit to another subqueue independent of the internal shifting of subqueue information. Advantageously, the first instruction in program order within the byte queue may be located by examining a limited number of positions (i.e. the first position of each subqueue). Similarly, additional instructions in program order may be located by examining a limited number of positions. Accordingly, logic circuits for selecting the instruction may be fewer in number than previously achievable. Since fewer logic circuits are involved, fewer cascaded levels of logic may be employed. The resulting circuitry may be operable at a higher frequency than previously achievable, enhancing performance of a microprocessor employing the apparatus.

The subqueues are additionally configured to handle instructions which overflow from a first subqueue into a second subqueue. Information pertaining to the overflowing instructions is maintained in the last position within the first subqueue. The information is not shifted when other positions within the subqueue are shifted. In this manner, information regarding an overflowing instruction is again located in a limited number of positions. Logic circuitry for handling the overflowing case is advantageously reduced in a similar fashion to the reduction of circuitry for locating instructions within the byte queue.

Broadly speaking, the present invention contemplates an apparatus for aligning instructions to a plurality of issue positions comprising a queue, a selection control unit, and a control unit. The queue is adapted for storing instructions, and includes a first portion and a second portion. The first portion is configured to store a first block of instructions, a first valid indication, and a second valid indication. The first valid indication is indicative of validity of a first instruction within the first block of instructions. Similarly, the second valid indication is indicative of validity of a second instruction within the first block of instructions. The second instruction is subsequent to the first instruction in program order. Similar to the first portion, the second portion is configured to store a second block of instructions and a third and fourth valid indication. The third valid indication is indicative of validity of a third instruction within the second block of instructions. In like fashion, the fourth valid indication is indicative of validity of a fourth instruction within the second block of instructions. The fourth instruction is subsequent to the third instruction in program order. Coupled to the queue, the selection control unit is configured to select a first dispatched instruction from the first instruction and the third instruction. The first dispatched instruction is dispatched to a first one of the plurality of issue positions. The first instruction is selected if the first valid indication indicates validity. Conversely, the third instruction is selected if the first valid indication indicates invalidity and the third valid indication indicates validity. Coupled to both the queue and the selection control unit, the control unit is configured to shift the second valid indication into the first valid indication if the first instruction is selected by the selection control unit. Additionally, the control unit is configured to shift the second portion of the queue into the first portion of the queue if instructions within the first portion of the queue have been dispatched.

The present invention further contemplates a method of aligning instructions to a plurality of issue positions, comprising several steps. A first instruction block is stored in a first portion of a queue. Additionally the first portion of the queue further stores a first valid indication indicative of validity of a first instruction within the first instruction block. Similarly, a second valid indication indicative of validity of a second instruction within the first instruction block is stored. A second instruction block is stored in a second portion of the queue. The second portion of the queue further stores a third valid indication indicative of validity of a third instruction within the second instruction block and a fourth valid indication indicative of validity of a fourth instruction within the second instruction block. A first dispatched instruction is dispatched to a first one of the plurality of issue positions. The first dispatched instruction is selected from the first instruction and the third instruction according to the first valid indication and the third valid indication. The second valid indication is shifted into the first valid indication if the first instruction is selected as the first dispatched instruction. Additionally, the second portion of the queue is shifted into the first portion of the queue if the first instruction and the second instruction have been dispatched.

The present invention still further contemplates a microprocessor comprising and instruction cache, a queue, a selection control unit, and a control unit. The instruction cache is configured to store a first block of instructions and a second block of instructions subsequent to the first block of instructions in program order. Coupled to receive the first block of instructions and the second block of instructions from the instruction cache, the queue includes a first portion and a second portion. The first portion is configured to store the first block of instructions, a first valid indication, and a second valid indication. The first valid indication is indicative of validity of a first instruction within the first block of instructions. The second valid indication is indicative of validity of a second instruction within the first block of instructions. The second instruction is subsequent to the first instruction in program order. The second portion is configured to store the second block of instructions, a third valid indication, and a fourth valid indication. The third valid indication is indicative of validity of a third instruction within the second block of instructions. Similarly, the fourth valid indication is indicative of validity of a fourth instruction within the second block of instructions. The fourth instruction is subsequent to the third instruction in program order. Coupled to the queue, the selection control unit is configured to select a first dispatched instruction from the first instruction and the third instruction according to the first valid indication and the third valid indication. Coupled to both the queue and the selection control unit, the control unit is configured to shift the second valid indication into the first valid indication if the first instruction is selected by the selection control unit. Furthermore, the control unit is configured to shift the second portion of the queue into the first portion of the queue if instructions within the first portion of the queue have been dispatched.

BRIEF DESCRIPTION OF THE DRAWINGS

Other objects and advantages of the invention will become apparent upon reading the following detailed description and upon reference to the accompanying drawings in which:

FIG. 5 is a diagram depicting valid combinations of instructions within a subqueue of the byte queue shown in FIG. 4 according to one embodiment of the byte queue.

FIG. 6 is a diagram depicting shifting of instruction information within a subqueue of the byte queue shown in FIG. 4 subsequent to selection of instructions for issue, according to one embodiment of the byte queue.

FIG. 9 is a diagram depicting the instruction information analyzed to determine which instructions from the byte queue to issue, according to one embodiment of the byte queue.

Figure 1:
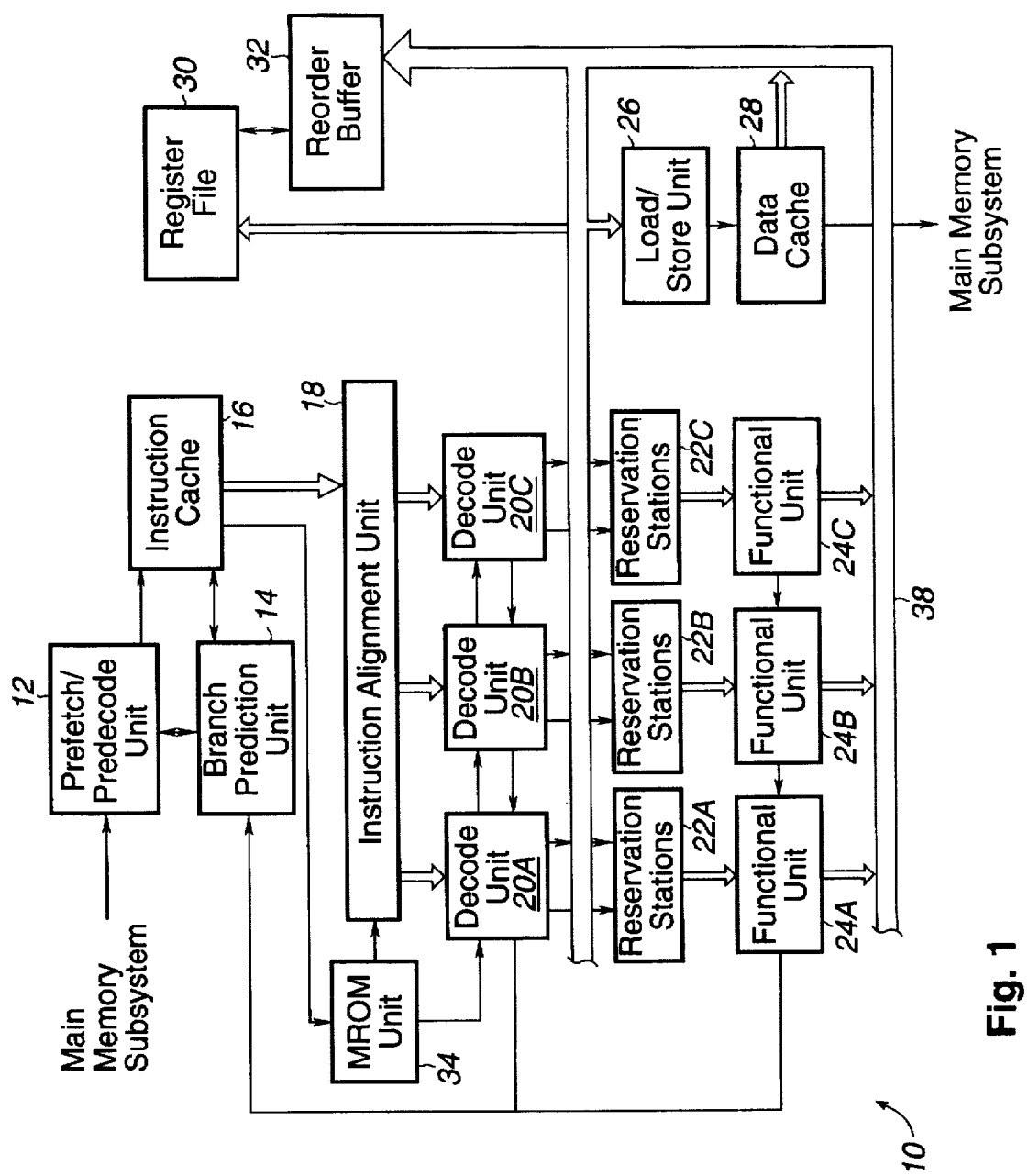
FIG. 1 is a block diagram of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Blocks referred to herein with a reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, microprocessor 10 is configured to align instructions from instruction cache 16 to decode units 20 using instruction alignment unit 18. Instructions are fetched as an aligned plurality of bytes from a cache line within instruction cache 16. Instructions of interest may be stored beginning at any arbitrary byte within the fetched bytes. For example, a branch instruction may be executed having a target address which lies within a cache line. The instructions of interest therefore begin at the byte identified by the target address of the branch instruction. From the instruction bytes fetched, instruction alignment unit 18 identifies the instructions to be executed. Instruction alignment unit 18 conveys the instructions, in program order, to decode units 20 for decode and execution.

Instruction alignment unit 18 includes a byte queue configured to store instruction bytes. An instruction scanning unit within instruction cache 16 separates the instructions fetched into instruction blocks. Each instruction block comprises a predefined number of instruction bytes. In one embodiment, the cache line size of instruction cache 16 is an integer multiple of the predefined number of instruction bytes within the instruction block (i.e. each cache line contains an integer number of instruction blocks). The instruction scanning unit identifies up to a predefined maximum number of instructions within the instruction block. Instruction identification information for each of the identified instructions is conveyed to instruction alignment unit 18 and is stored in the byte queue. The instruction identification information includes an indication of the validity of the instruction, as well as indications of the start and end of the instruction within the predefined number of instruction bytes. In one embodiment, the predefined number of instruction bytes comprises eight instruction bytes stored in contiguous main memory storage locations. The eight instruction bytes are aligned to an eight byte boundary (i.e. the least significant three bits of the address of the first of the contiguous bytes are zero). If more than the maximum number of instructions are contained within a particular predefined number of instruction bytes, the instruction bytes are scanned again during a subsequent clock cycle. The same instruction bytes are conveyed as another instruction block, with the additional instructions within the instruction bytes identified by the accompanying instruction identification information. Therefore, an instruction block may be defined as up to a predefined maximum number of instructions contained within a predefined number of instruction bytes. It is noted that the maximum number of instructions may be chosen based upon the number of functional units within the microprocessor as well as the average number of bytes per instruction. In many code sequences, the average number of bytes per x86 instruction is approximately three. Therefore, the average number of instructions in an eight byte instruction block is approximately three. Additionally, the number of functional units shown in FIG. 1 is three. Accordingly, in one embodiment, the maximum number of instructions per instruction block is three.

The byte queue stores each instruction block and corresponding instruction identification information within a subqueue defined therein. The subqueues include a position for each possible valid instruction. The positions store instruction identification information and are maintained such that the instruction identification information for the first valid instruction within the subqueue is stored in a first position within the subqueue, instruction identification information regarding the second valid instruction (in program order) is stored in a second position within the subqueue, etc. When instructions within the subqueue are dispatched, instruction identification information corresponding to subsequent instructions are shifted within the positions of the subqueue such that the first of the remaining instructions is stored in the first position. Advantageously, instruction alignment unit 18 may only consider the instruction information stored in the first position of each subqueue to detect the instruction to be dispatched to decode unit 20A. Similarly, only the second position of the first subqueue (the subqueue storing instructions prior to the instructions stored in the other subqueues in program order) may be considered for dispatch of instructions to decode unit 20B. By managing the subqueues in this manner, logic for selecting and aligning instructions may be simplified. Fewer cascaded levels of logic may be employed for performing the selection and alignment process, allowing for high frequency implementation of microprocessor 10.

Because instructions are variable length, an instruction may begin within a particular instruction block but end in another instruction block. Instructions beginning within a particular instruction block and ending in another instruction block are referred to as "overflow instructions". The subqueue storing the instruction block within which an overflow instruction begins uses the last position to store the overflow instruction's identification information. Unlike the other positions, the instruction identification information of the last position is not shifted from the last position when an overflow instruction is stored therein. Advantageously, instruction alignment unit 18 need only search the last position of a particular subqueue to identify an instruction overflowing from one subqueue to another.

As used herein, the term queue refers to a storage device for storing a plurality of data items. The data items are stored with an ordered relationship between them. For example, the data items of the byte queue are instructions. The ordered relationship between the instructions is the program order of the instructions. Data items are removed from the queue according to the ordered relationship in a first in-first out (FIFO) fashion. Additionally, the term shifting is used to refer to movement of data items within the queue. When a data item is shifted from a first storage location to a second storage location, the data item is copied from the first storage location to the second storage location and invalidated in the second storage location. The invalidation may occur by shifting yet another data item into the second storage location, or by resetting a valid indication in the second storage location.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Decode unit 20A receives an instruction which is prior to instructions concurrently received by decode units 20B and 20C (in program order). Similarly, decode unit 20B receives an instruction which is prior to the instruction concurrently received by decode unit 20C in program order. As used herein, the term "program order" refers to the order of the instruction as coded in the original sequence in memory. The program order of instructions is the order in which the instructions would be executed upon a microprocessor which fetches, decodes, executes, and writes the result of a particular instruction prior to fetching another instruction. Additionally, the term "dispatch" is used to refer to conveyance of an instruction to an issue position which is to execute the instruction. Issue positions may also dispatch load/store memory operations to load/store unit 26.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. As used herein, the term "issue position" refers to logic circuitry configured to receive an instruction and to execute that instruction. Once the instruction enters the issue position, it remains in that issue position until the execution of the instruction is completed.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated similar to load/store unit 26 in that any of decode units 20 may dispatch instructions to the floating point unit. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
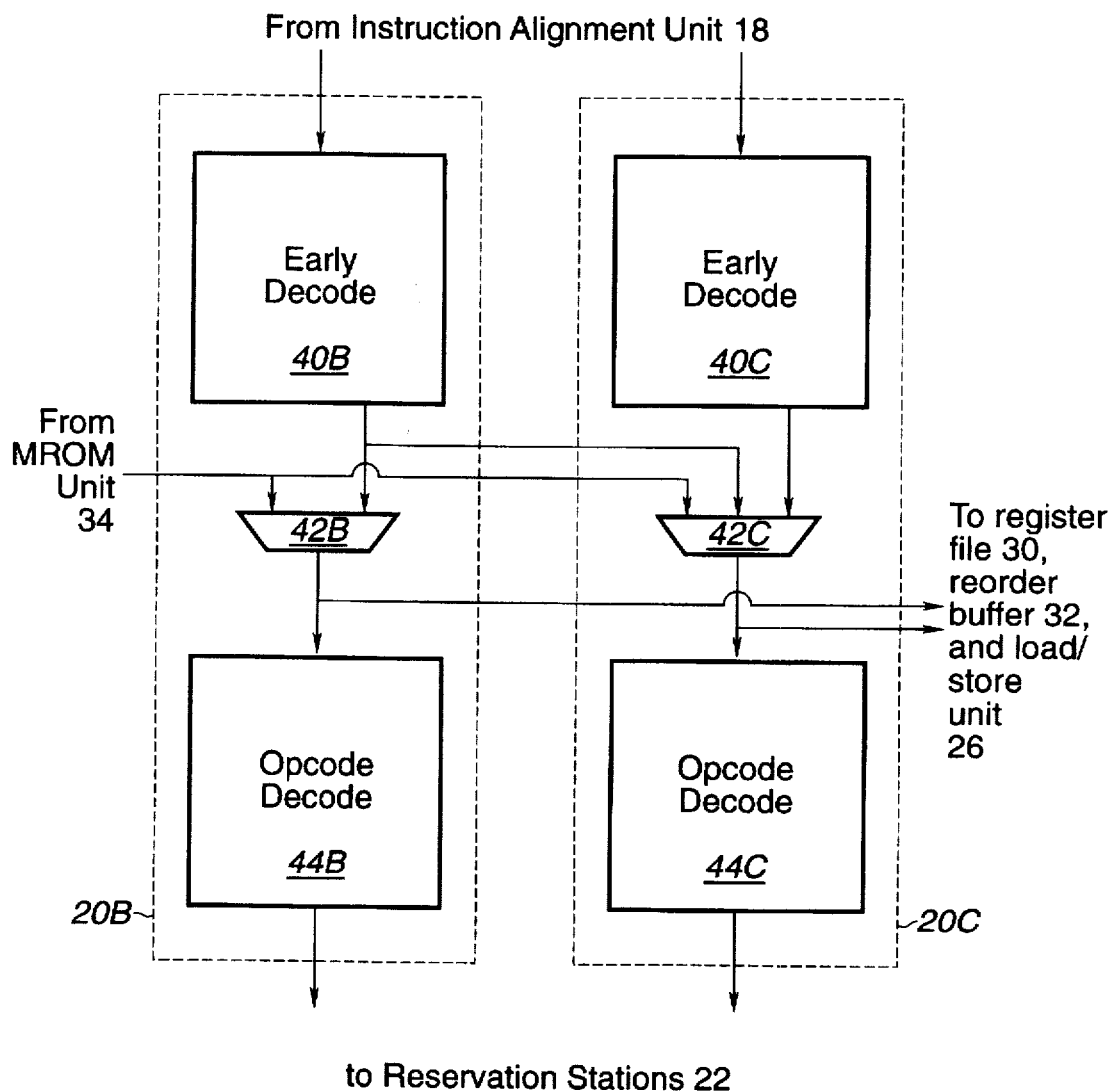
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
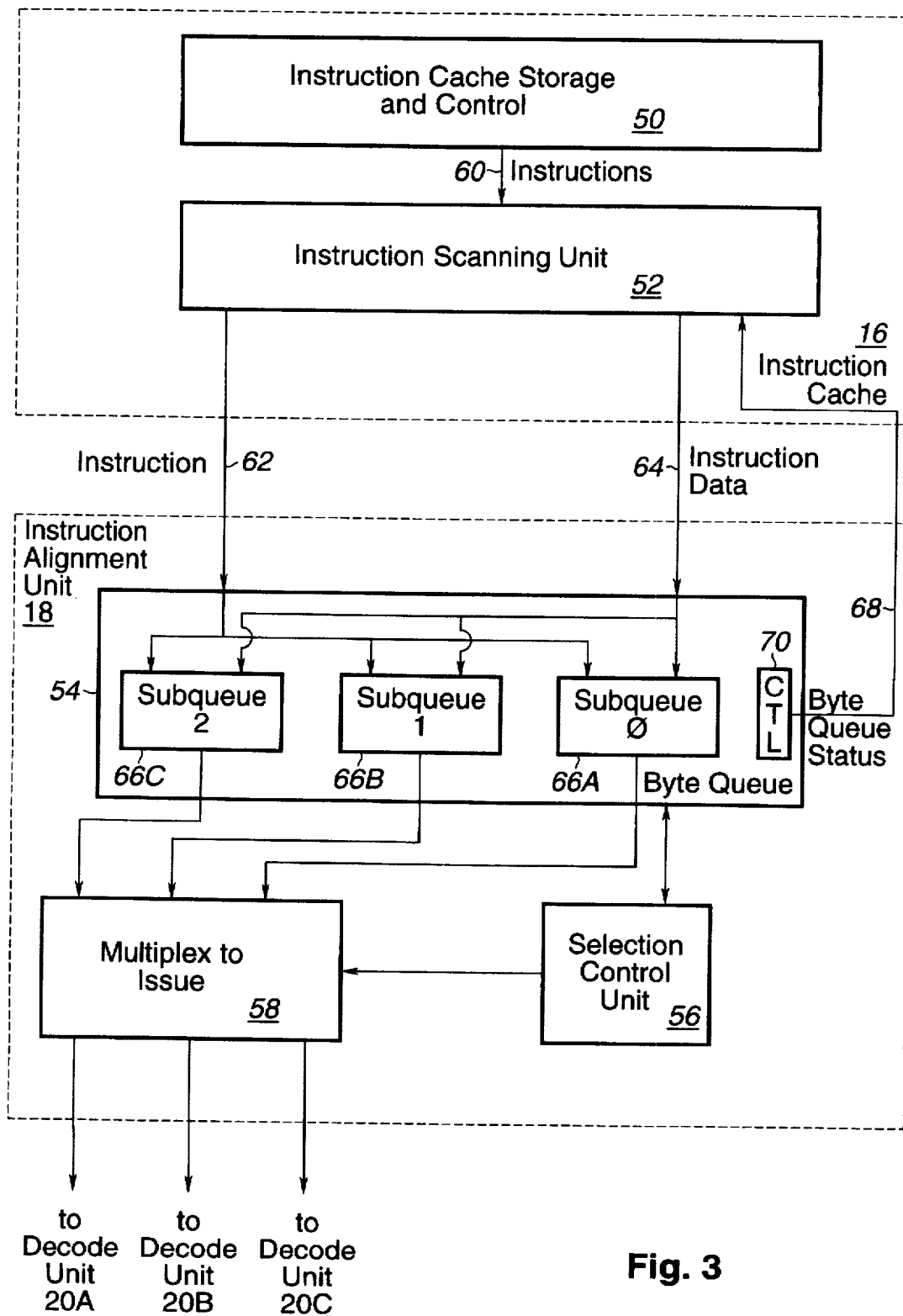
FIG. 3 is a block diagram of one embodiment of an instruction cache and an instruction alignment unit shown in FIG. 1.

Turning now to FIG. 3, a block diagram of one embodiment of instruction cache 16 and instruction alignment unit 18 are shown. Instruction cache 16 includes an instruction cache storage and control block 50 and an instruction scanning unit 52. Instruction alignment unit 18 includes a byte queue 54, a selection control unit 56, and a multiplex to issue block 58.

Instruction cache storage and control block 50 includes storage for instruction cache lines and related control circuitry for fetching instructions from the storage, for selecting cache lines to discard when a cache miss is detected, etc. Instruction cache storage and control block 50 receives fetch addresses from branch prediction unit 14 (not shown) in order to fetch instructions for execution by microprocessor 10. Instruction bytes fetched from instruction cache storage and control block 50 are conveyed to instruction scanning unit 52 upon an instructions bus 60. Instruction bytes are conveyed upon instructions bus 60, as well as corresponding predecode data (e.g. start, end, and functional bits). In one embodiment, sixteen bytes stored in contiguous memory locations are conveyed upon instructions bus 60 along with the corresponding predecode data. The sixteen bytes form either the upper or lower half of the 32 byte cache line. The upper half of the cache line is the half stored in memory addresses having larger numerical values, while the lower half is stored in memory addresses having smaller numerical values. Additionally, instruction scanning unit 52 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 52 scans the predecode data associated with the bytes which are to be conveyed as instructions to instruction alignment unit 18. Instruction scanning unit 52 divides the sixteen bytes conveyed by instruction cache storage and control block 50 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 50, according to the present embodiment. As used herein, bytes are contiguous if they are stored in contiguous memory locations in the main memory subsystem. It is noted that particular sizes of various components are used herein for clarity of the description. Any size may be used for each component within the spirit and scope of the appended claims.

Instruction scanning unit 52 scans the predecode data of each portion of the instructions independently and in parallel. Instruction scanning unit 52 identifies up to a predefined maximum number of instructions within each portion from the start and end byte information included within the predecode data. For the present embodiment, the predefined maximum number is three. Generally speaking, instruction scanning unit 52 preferably identifies a maximum number of instructions in each portion equal to the number of issue positions included within microprocessor 10.

The instruction bytes and instruction identification information generated by instruction scanning unit 52 are conveyed to byte queue 54 upon an instructions bus 62 and an instruction data bus 64, respectively. The instruction bytes are conveyed as eight byte portions, and the instruction data is arranged accordingly such that each eight byte portion is associated with a portion of the instruction identification information conveyed upon instruction data bus 64. Each eight byte portion and the corresponding instruction identification information forms an instruction block. It is noted that, although an instruction block includes eight bytes in the present embodiment, instruction blocks may include any number of bytes in various embodiments. Byte queue 54 receives the instruction blocks conveyed and stores them into one of multiple subqueues included therein. In the embodiment shown, byte queue 54 includes three subqueues: a first subqueue 66A, a second subqueue 66B, and a third subqueue 66C. First subqueue 66A stores the instruction block which is foremost among the instruction blocks stored in byte queue 54 in program order. Second subqueue 66B stores the instruction block which is second in program order, and third subqueue stores the instruction block which is third in program order.

If a particular eight byte portion as scanned by instruction scanning unit 52 includes more than the maximum predefined number of instructions, then the particular eight byte portion is retained by instruction scanning unit 52. During the following clock cycle, the particular eight byte portion is scanned again. The predecode data corresponding to the previously identified instructions is invalidated such that instruction scanning unit 52 detects the additional instructions. If the other eight byte portion concurrently received with the particular eight byte portion is subsequent to the particular eight byte portion in program order, then the other eight byte portion is rescanned as well. Byte queue 54 discards the instruction blocks received from the other eight byte portion, in order to retain program order among the instruction blocks stored in the byte queue.

A control unit 70 within byte queue 54 conveys a byte queue status upon byte queue status bus 68 to instruction scanning unit 52. Byte queue status bus 68 includes a signal corresponding to each subqueue 66. The signal is asserted if the subqueue 66 is storing an instruction block, and deasserted if the subqueue 66 is not storing an instruction block. In this manner, instruction scanning unit 52 may determine how many instruction blocks are accepted by byte queue 54 during a clock cycle. If two instruction blocks are conveyed during a clock cycle and only one instruction block is accepted, instruction scanning unit 52 retains the rejected instruction block and rescans the instruction block in the subsequent clock cycle.

As noted above, an instruction block may contain up to a predefined maximum number of instructions (e.g. three in the present embodiment). Additionally, eight contiguous bytes are conveyed for each instruction block. However, due to the variable byte length of the x86 instructions, an instruction may begin within one set of eight contiguous bytes and end in another set of eight contiguous bytes, referred to as overflow instructions. If an overflow instruction is detected, it is identified as the last of the predefined number of instructions. Instead of being indicated as a valid instruction within the instruction block, the overflow instruction is identified as an overflow. Instruction identification information is generated, but the instruction is handled somewhat differently, as will be explained in more detail below.

In one embodiment, the instruction identification information for each instruction includes: (i) start and end pointers identifying the bytes at which the identified instruction begins and ends within the eight bytes; (ii) a valid mask containing eight bits, one for each of the eight bytes; (iii) a bit indicative of whether the instruction is MROM or fast path; and (iv) an instruction valid bit indicating that the instruction is valid and an overflow bit for the last instruction indicating that it is an overflow. The valid mask includes a binary one bit corresponding to each byte included within the particular instruction (i.e. the bits between the start pointer and end pointer, inclusive, are set). Zero bits are included for the other bytes. Additional information conveyed with the instruction identification information is the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 50 except for the branch prediction, which is provided by branch prediction unit 14.

Selection control unit 56 examines the instruction identification information stored in each subqueue to generate selection controls for multiplex to issue block 58. Multiplex to issue block 58 includes a plurality of multiplexors for selecting instruction bytes from byte queue 54 for conveyance to each of decode units 20. Byte queue 54 maintains certain properties with respect to each subqueue 66 in order to simplify the selection logic within selection control unit 56, as will be explained in more detail below. Instructions are selected and conveyed, and corresponding instruction identification information is invalidated such that subsequent instructions may be dispatched in subsequent clock cycles.

It is noted that MROM instructions are identified by instruction scanning unit 52 as well. Instruction scanning unit 52 routes the MROM instructions to MROM unit 34 (not shown). However, the MROM instructions may flow through instruction alignment unit 18 as well. In this manner, instruction alignment unit 18 may detect the MROM instruction and convey it to decode units 20 without any other instructions. MROM unit 34 may then insert the corresponding instructions between early decode units 40 and opcode decode units 44 when the MROM instruction arrives in early decode units 40, as described above with respect to FIG. 2.

Figure 4:
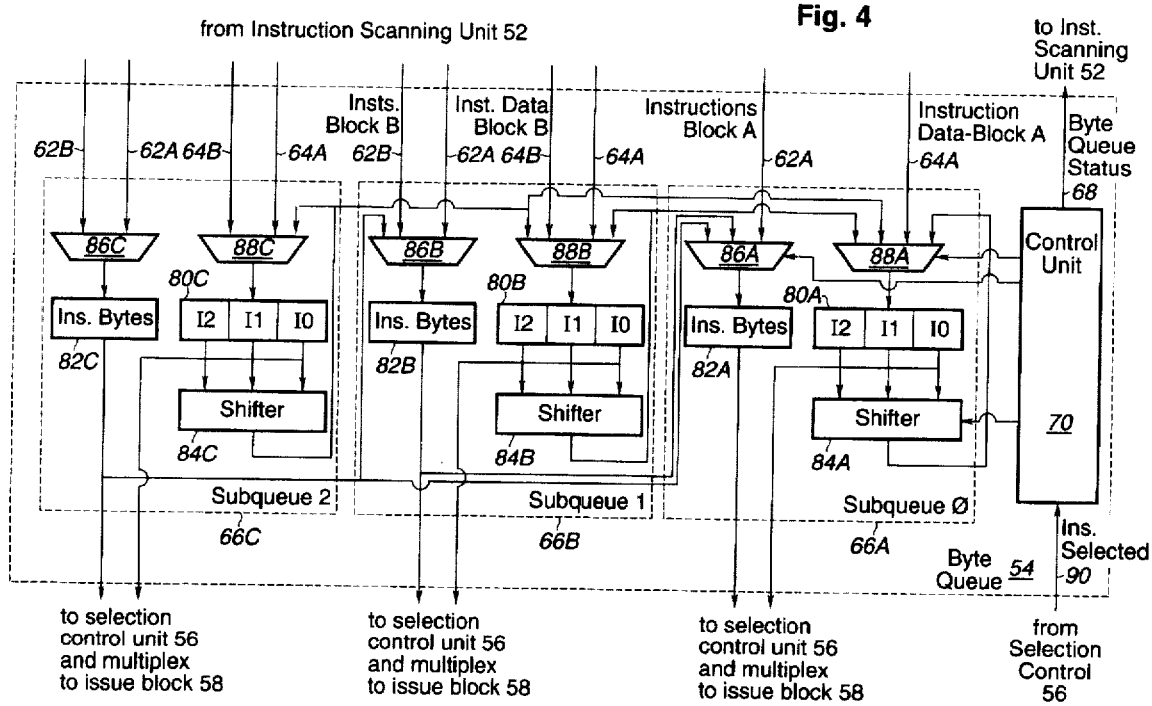
FIG. 4 is a block diagram of one embodiment of a byte queue shown in FIG. 3.

Turning now to FIG. 4, a block diagram of one embodiment of byte queue 54 is shown. Subqueues 66 are shown in more detail, and control unit 70 is shown as well. First subqueue 66A includes an instruction position storage 80A, an instruction bytes storage 82A, a shifter block 84A, and a pair of multiplexors 86A and 88A. Second subqueue 66B and third subqueue 66C include similar elements, numbered with like reference numbers postfixed with a "B" and a "C", respectively. The elements and operation of first subqueue 66A will be described in detail, and the elements and operations of second subqueue 66B and third subqueue 66C are similar.

Instruction position storage 80A includes storage for instruction identification information corresponding to each instruction within the instruction block stored therein. In the present embodiment, up to three instructions may be stored in an instruction block. Therefore, three positions are included within instruction position storage 80A. The first position (labeled I0) stores the instruction identification information corresponding to the instruction which is foremost in program order within the instruction block. The second position (labeled I1) stores the instruction identification information corresponding to the second instruction in program order within the instruction block. Finally, the third position (labeled I2) stores the instruction identification information corresponding to the last instruction in program order. Alternatively, the third position may store instruction identification information corresponding to an overflow instruction. Certain instruction identification information is the same for each instruction (e.g. the segment limit). To avoid duplicating information, this instruction information is stored in instruction bytes storage 82A along with the instruction bytes which are within the instruction block.

Control unit 70 maintains the information stored in each subqueue 66. In particular, control unit 70 directs shifter block 84 to shift instruction identification information between the positions when instruction are selected for dispatch. For example, if the instruction corresponding to position I0 is dispatched, the information stored in position I1 is shifted into position I0 and the information stored in position I2 is shifted into position I1. Similarly, if the instructions corresponding to positions I0 and I1 are dispatched, then information stored in position I2 is shifted into position I0. In this manner, the instruction within the subqueue which is foremost in program order is maintained in position I0, the instruction which is second in program order is maintained in position I1, etc. In order to select an instruction for dispatch to decode unit 20A, selection control unit 56 examines the instruction identification information stored in position I0 of each subqueue. Advantageously, a small amount of logic may be employed to select the instruction. Similarly, position I0 of subqueue 66A and position I2 of each subqueue 66A–66C are not examined to select an instruction for decode unit 20B. The second instruction to be dispatched will be found within the first two positions of one of the subqueues 66 when maintained in accordance with the above.

Instruction identification information is shifted internally to each subqueue 66 independently. Instruction identification information is not, therefore, shifted from position I0 of subqueue 66B into positions within subqueue 66A. Instead, when each of the instructions within subqueue 66A have been dispatched, subqueue 66B is shifted into subqueue 66A as a whole. The logic for shifting between subqueues 66 may operate independently from and in parallel with the internal shifting of each subqueue 66A–66C.

Position I2 may store instruction identification information regarding an overflow instruction. If position I2 is storing information regarding an overflow instruction, then the information is not shifted to position I0 or I1 as described above. In this manner, overflow instruction information is always available in position I2. Selection control unit 56 may examine the information stored in position I2 for routing bytes corresponding to an overflow instruction, as opposed to having to locate the overflow information within the positions and then determining byte routing.

Control unit 70 receives an indication of the instructions selected for dispatch from selection control unit 56 upon an instructions selected bus 90. For example, a signal may be included for each position within position storages 80. The signal may be asserted if the instruction corresponding to the position is selected. Control unit 70 may direct each shifter block 84A–84C dependent upon the selection signals associated with that instruction block. Alternatively, the signal corresponding to the last instruction in program order to be selected for dispatch may be asserted. Positions prior to the position storing the last instruction are shifted out. For example, if an instruction from position I0 of subqueue 66A is selected for dispatch, then shifter block 84A is directed to shift position I1 into position I0 and position I2 into position I1 (if position I2 is not storing an overflow instruction). Additionally, control unit may direct the shifting of one subqueue into another subqueue based upon the stored instruction identification information and the instructions selected. For example, if positions I0 and I1 of subqueue 66A have been selected for dispatch and position I2 is invalid and not storing overflow information, then subqueue 66B may be shifted into subqueue 66A (and subqueue 66C may be shifted into subqueue 66B). If the valid instructions within subqueue 66B have been dispatched as well, then subqueue 66C may be shifted into subqueue 66A.

Control unit 70 provides control signals to shifter blocks 84A–84C and multiplexors 86A–86C and 88A–88C in order to cause the appropriate shifting to occur. Control signals are shown in FIG. 4 coupled between control unit 70 and shifter block 84A, multiplexor 86A, and multiplexor 88A. Control signals between shifter blocks 84B–84C, multiplexors 86B–86C, and multiplexors 88B–88C have been omitted from FIG. 4 for clarity.

In the present embodiment, up to two instruction blocks may be conveyed to byte queue 54 during a clock cycle. The first instruction block is conveyed upon a portion of instruction bus 62 and instruction data bus 64, shown in FIG. 4 as instructions block A bus 62A and instruction data—block A bus 64A. Similarly, the second instruction block is conveyed upon instructions block B bus 62B and instruction data—block B bus 64B. Because first subqueue 66A stores the instruction block which is foremost in program order, first subqueue 66A receives instructions block A bus 62A and instruction data—block A bus 64A. Second subqueue 66B and third subqueue 66C may receive either instruction block and therefore receive both sets of buses upon which the instruction blocks are conveyed.

For first subqueue 66A, instructions block A bus 62A is coupled to multiplexor 86A. Multiplexor 86A provides the information stored in instruction bytes storage 82A, to which multiplexor 86A is coupled. Multiplexor 86A also receives the information stored in instruction bytes storages 82B and 82C, to allow for shifting of the contents of second subqueue 66B or third subqueue 66C into first subqueue 66A. As mentioned above, such shifting is performed when each of the instructions from the instruction block stored in subqueue 66A have been dispatched.

Similarly, multiplexor 88A provides the information stored in instruction position storage 80A. Therefore, instruction data-block A bus 64A is coupled thereto. Additionally, the output of shifter blocks 84B and 84C are coupled to multiplexor 88A for allowing shifting between the subqueues. The output of shifter blocks 84B and 84C are selected so that shifting internal to the subqueue may be performed in parallel with shifting one subqueue's information into another. For example, the remaining instructions within first subqueue 66A may be dispatched concurrently with the instruction from position I0 of second subqueue 66B. Therefore, the information in subqueue 66B is shifted such that the information in position I1 is shifted into I0 (and possibly the information from position I2 into I1). Concurrently, the information in subqueue 66B is shifted into subqueue 66A. By selecting the output of shifter block 84B, the shifted position information is conveyed to first subqueue 66A. Therefore, the internal shifting of the subqueue and the shifting of the information into another subqueue have both been performed. Additionally, the two shifting activities are independent of one another. Internal shifting of a particular subqueue is determined based upon the number of instructions dispatched from that subqueue and the overflow status of position I2. Shifting from a particular subqueue into another subqueue is selected if the other subqueue is emptied via the instructions dispatched during a clock cycle.

Finally, multiplexor 88A receives the output of shifter block 84A. When instructions have been dispatched from first subqueue 66A but instructions still remain within first subqueue 66A, shifter block 84A supplies the shifted position information to instruction position storage 80A. It is noted that the function of each shifter block 84A–84C may be incorporated into the multiplexors 88 which receive the output of that shifter block 84A–84C.

As noted above, control unit 70 provides a byte queue status to instruction scanning unit 52 upon byte queue status bus 68. Control unit 70 may determine the status to convey based upon the instruction identification information stored in each subqueue 66 and the corresponding instruction selection information conveyed upon instruction selection bus 90. In particular, if third subqueue 66C does not contain any valid instructions or the information is being shifted to another subqueue 66, then the signal associated with subqueue 66C is deasserted upon byte queue status bus 68. Similarly, if second subqueue 66B does not contain any valid instructions or the instructions have been dispatched and third subqueue 66C does not contain any valid instructions which have not been dispatched, then the signal corresponding to second subqueue 66B is deasserted. The signal associated with first subqueue 66A may be handled similarly.

Information from instruction bytes storages 82 and instruction position storages 80 are conveyed to both selection control unit 56 (for examination) and to multiplex to issue block 58 (for multiplexing to a particular decode unit 20). Since instruction bytes storages 82 store certain instruction identification information which is shared by each of the positions, a portion of the information stored therein is examined by selection control unit 56. Additionally, certain information in the instruction identification information is used by decode units 20, and therefore is multiplexed to the decode unit along with the corresponding instruction bytes.

Turning next to FIG. 5, a table 94 is shown identifying the valid combinations of instructions which may be stored within a particular subqueue according to the present embodiment. Each row of table 94 is a valid combination of instructions, listed by position (I0–I2 as shown across the top of table 94). The symbol "X" in a position indicates an invalid instruction (i.e. no instruction is stored therein). The symbols "A", "B", and "C" indicate that valid instruction identification information is stored in that position. Symbol "A" identifies an instruction prior to instructions identified by symbols "B" and "C" in program order. Similarly, symbol "B" identifies an instruction prior to the instruction identified by symbol "C" in program order. The symbol "O" in position I2 indicates that instruction identification information is stored therein with respect to an overflow instruction. The symbol "O" represents an instruction subsequent to the instructions identified by symbols "A" and "B" in program order.

Table 94 illustrates that instruction identification information is stored in position I1 only when instruction identification information is stored in position I0. Similarly, instruction identification information is stored in position I2 only when instruction identification information is stored in both positions I0 and I1, except when position I2 stores an overflow instruction. When position I2 stores an overflow instruction, position I1 still stores instruction identification information only if position I0 stores instruction identification information. However, position I2 stores the overflow instruction information independent of the status of positions I0 and I1. Advantageously, the instruction which is foremost in program order is stored in position I0, even after instructions from the instruction block have been dispatched. Additionally, overflow instructions remain stored in position I2, even after instructions from the instruction block have been dispatched.

FIG. 6 is a truth table 96 depicting the possible transitions within a subqueue 66 depending upon the instructions selected for issue (or dispatch). Each row depicts an initial state for positions I0–I2, the instructions selected for issue, and the final state for positions I0–I2. When no instructions are selected from a subqueue, no change occurs in the instruction information stored therein. These possibilities are not shown in FIG. 6. Symbol definitions are similar to those described above for FIG. 5. It is noted that, when an overflow instruction is stored in position I2, the remainder of the instruction is stored in a subsequent subqueue 66 in position I0. When the overflow instruction is selected, the corresponding portion is concurrently selected from the subsequent subqueue 66.

As an example, consider the second row of truth table 96 (reference number 98). The initial state of the subqueue is two instructions (A and B) stored in position I0 and I1, respectively. Instruction A is selected for issue, and therefore instruction information regarding instruction B is shifted from position I1 to position I0. The final state of the subqueue is instruction information regarding instruction B stored in position I0, and invalid instruction information stored in positions I1 and I2.

Figure 7:
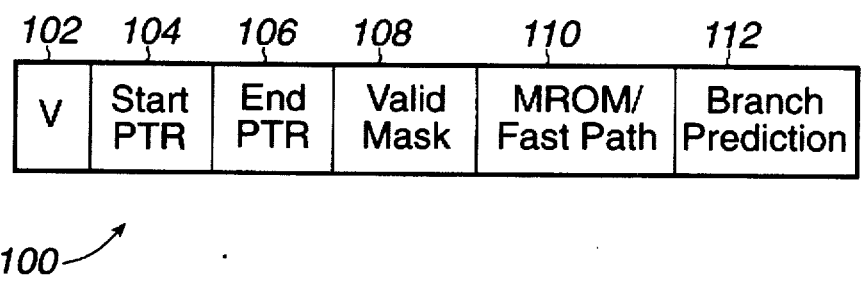
FIG. 7 is a diagram of instruction information stored with respect to each instruction within a subqueue of the byte queue shown in FIG. 4, according to one embodiment of the byte queue.

Turning now to FIG. 7, a diagram depicting exemplary information stored in a position 100 of a position storage 80, according to one embodiment. For example, position 100 may be position I0, I1 or I2. Each position stores equivalent information regarding different instructions. Position 100 stores a valid indication 102, a start pointer 104, an end pointer 106, a valid mask 108, an MROM/fast path indication 110, and a branch prediction indication 112.

Valid indication 102 identifies the validity or invalidity of the remainder of the information stored in position 100. If the valid indication indicates validity, then instruction identification information is stored in position 100. If the valid indication indicates invalidity, then instruction identification information is not stored within position 100 (i.e. position 100 is empty). In one embodiment, valid indication 102 comprises a bit indicative, when set, that instruction identification information is stored within position 100. When clear, the bit indicates that instruction identification information is not stored within position 100.

Start pointer 104 and end pointer 106 locate the byte positions within the instruction block at which the instruction identified in position 100 begins and ends, respectively. For embodiments in which an instruction block includes 8 bytes, start pointer 104 and end pointer 106 each comprise three bit values indicating the numerical position between zero and seven of the respective start or end point. Valid mask 108 is a mask of zeros and ones. Each bit in the mask corresponds to one of the bytes within the instruction block. Bits in the mask corresponding to bytes not included within the instruction identified by position 100 are set to zero. Conversely, bits in the mask corresponding to bytes included within the instruction are set to one. For example, if the instruction identified by position 100 begins at the third byte within the instruction block and ends at the fifth byte within the instruction block, the start pointer is 010, the end pointer is 100, and the mask is 00111000 (all expressed in binary format). The start pointer, end pointer, and mask are used by selection control unit 56 to generate selection controls for multiplex to issue block 58 when the instruction is selected for issue.

MROM/fast path indication 110 indicates the MROM or fast path nature of the instruction identified by position 100. In one embodiment, indication 110 comprises a bit indicative, when set, that the instruction is an MROM instruction. When clear, the bit indicates that the instruction is a fast past instruction. Fast path instructions may be selected concurrently with other fast path instructions, while MROM instructions are selected without any other concurrent instructions being selected. Indication 110 is used by selection control unit 56 during instruction selection to enforce the separation of MROM instructions from fast path instructions. Finally, branch prediction indication 112 comprises a bit indicative, when set, that the instruction is a branch instruction which is predicted taken. When clear, the bit indicates that the instruction is either not a branch instruction or is a branch instruction predicted not taken. In one embodiment, reorder buffer 32 limits the number of predicted-taken branches which may be concurrently dispatched (i.e. within the same line in reorder buffer 32) to one. Therefore, selection control unit 56 uses branch prediction indication 112 to detect a pair of predicted-taken branches which would otherwise be concurrently dispatched.

Figure 8:
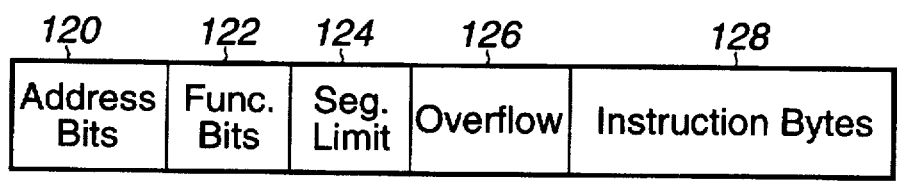
FIG. 8 is a diagram of instruction information stored with respect to an instruction block within a subqueue of the byte queue shown in FIG. 4, according to one embodiment of the byte queue.

Turning now to FIG. 8, a diagram depicting exemplary information stored in instruction bytes storages 82 is shown, according to one embodiment. An address bits field 120, a functional bits field 122, a segment limit field 124, an overflow indication 126, and an instruction bytes field 128 are included. Address bits field 120 stores a pair of address bits which identify the quarter of the cache line from which the instruction block was fetched. Functional bits field 122 stores the original functional bits from the predecode data associated with the instruction bytes within the instruction block.

Segment limit field 124 is used to detect instructions being dispatched from outside the code segment. As will be appreciated by those skilled in the art, the x86 microprocessor architecture divides the memory space into segments. One of these segments is the code segment, from which instructions are fetched. The segment has a defined limit, which may be of arbitrary size. If instruction execution proceeds outside of the code segment, a segment limit violation exception is signalled. Microprocessor 10 may handle segment limit violations as follows: if an entire set of instructions fetched from instruction cache 16 during a clock cycle lies outside the code segment, the instructions are not conveyed to instruction alignment unit 18. Instead, the segment limit violation is signalled to reorder buffer 32. If instructions prior to the segment limit violation retire successfully (as opposed to being discarded due to branch misprediction or other exception), then the exception may be taken at that time. However, the limit may be arbitrary and therefore may fall within the set of instructions fetched from instruction cache 16. Segment limit field 124 is included for handling this case. If the limit is crossed within the instruction block stored in instruction bytes storage 82, then segment limit field 124 indicates which byte position represents the segment limit. In one embodiment, segment limit field 124 comprises three bits to indicate a limit at one of the eight bytes within the instruction block. If an instruction beyond the limit imposed by segment limit field 124 is dispatched, an exception is signalled to reorder buffer 32.

Overflow indication 126 indicates that one of the instructions within the instruction block overflows into the subsequent instruction block. Information regarding the overflowing instruction is stored in position I2 of the corresponding instruction position storage 80, and is not shifted from position I2 to other positions. In one embodiment, overflow indication 126 comprises a bit indicative, when set, that an instruction within the instruction block overflows. When clear, the bit indicates that no instruction within the instruction block overflows. If overflow indication 126 is set, then the valid indication within position I2 is clear. Alternatively, overflow indication 126 is clear if the valid indication within position I2 is set. In this manner, position I2 is indicated either to store an overflow instruction or a valid instruction ending within the instruction block, but not both. Additionally, position I2 is indicated to be not storing an instruction if both overflow indication 126 and the valid indication for position I2 are clear. Instruction bytes field 128 stores the actual instruction bytes included within the instruction block. In one embodiment, instruction bytes field 128 is eight bytes wide.

Turning next to FIG. 9, a table 130 is shown depicting the positions analyzed by selection control unit 56 in selecting instructions for issue to each issue position. Each row of table 130 corresponds to a particular issue position, as identified by the first column of table 130. For issue position 0, selection control unit 56 analyzes instruction identification information stored in position I0 of each subqueue 66. Additionally, the overflow bit is examined for subqueues 66A and 66B. Valid bits from each position I0 are analyzed to select an instruction to issue. If position I0 of first subqueue 66A is valid, then that instruction is selected for issue to issue position zero. If position I0 of second subqueue 66B is valid and position I0 of first subqueue 66A is invalid, then the instruction corresponding to position I0 of second subqueue 66B is selected. Finally, the instruction corresponding to position I0 of third subqueue 66C is selected if position I0 of subqueues 66A and 66B are invalid. Because instructions may be up to 15 bytes long, an instruction may begin in first subqueue 66A, overflow into second subqueue 66B, and further overflow into third subqueue 66C. Such a case is an example where position I0 of third subqueue 66C is selected. In addition, the overflow indications from first and second subqueues 66A and 66B are considered in creating multiplexor selection controls for multiplex to issue block 58. If position I0 of second subqueue 66B is selected and the overflow indication of first subqueue 66A indicates overflow, then instruction bytes from first subqueue 66A form a portion of the instruction indicated by position I0 of second subqueue 66B. The start pointer and valid mask corresponding to position I2 of subqueue 66A are used to multiplex the instruction bytes with instruction bytes indicated by the end pointer and valid mask corresponding to instruction I0 of subqueue 66B (or subqueue 66C, if the instruction overflows thereto).

For issue position one, position I1 of first subqueue 66A is analyzed along with positions I0 and I1 of second and third subqueues 66B and 66C. Because byte queue 54 maintains each subqueue such that instructions are shifted to occupy positions I0 and I1 when previous instructions within the subqueue are dispatched, position I1 is the only position within first subqueue 66A which may contain the second instruction in program order which is to be dispatched during a clock cycle. Similarly, positions I0 and I1 of subqueues 66B and 66C may contain the second instruction to be dispatched. If a position I0 is selected for dispatch, the overflow indication of the preceding subqueue is also analyzed for forming multiplexor selection controls.

For issue position two, position I2 of first subqueue 66A is analyzed along with each of the positions of second and third subqueues 66B and 66C. Similar to the above discussion, if position I0 of a subqueue is selected, the overflow indication of the preceding subqueue is analyzed to determine multiplexor selection controls.

Table 130 illustrates certain advantages of operating byte queue 54 in the manner described herein. Selection of the instructions for issue position zero involves analyzing only three positions out of the nine positions included within byte queue 54. If byte queue 54 where implemented as, for example, a circular buffer, then each of the positions would have to be considered for dispatch to issue position zero. Similarly, analysis of only a few issue positions is performed to select the instruction for issue position one. Selection logic is thereby reduced, allowing for fewer cascaded levels of logic. A higher operating frequency for microprocessor 10 may thereby be achieved.

Table 130 shows the positions analyzed to select instructions for issue. However, even though an instruction may be selectable for issue based upon table 130, other factors may cause a particular instruction not to be issued. For example, the instruction in position I0 of second subqueue 66B may be selected as the instruction to be issued to issue position one in microprocessor 10 during a clock cycle. However, the instruction in position I0 of first subqueue 66A may be an MROM instruction. Because microprocessor 10 dispatches MROM instructions without concurrent issue of other instructions, the instruction in position I0 of second subqueue 66B is not selected. Other such restrictions may be imposed depending upon the embodiment of microprocessor 10, and may be include within the logic of selection control unit 58. For example, instructions from no more than two distinct cache lines may be concurrently dispatched, according to one embodiment. This restriction is imposed by reorder buffer 32 having two storage locations for addresses of the instructions within a given line of reorder buffer 32. Additional dispatch restrictions imposed according to one particular embodiment may include a restriction that no more than one predicted branch or split line instruction may be included. A split line instruction is an instruction having bytes located within two instruction cache lines. This restriction may have one exception, according to the particular embodiment: if the split line instruction is foremost in program order within the selected instructions, a predicted branch instruction may be included as well.

Although the above description discusses an embodiment which selects up to one instruction for each issue position from byte queue 54, another embodiment of instruction selection is contemplated for use with double dispatch instructions. For this embodiment, a fast path instruction is included with double dispatch instructions, advantageously filling each of the available issue positions. However, MROM unit 34 identifies the double dispatch instructions, and the identification may not occur until the clock cycle subsequent to instruction selection from byte queue 54. MROM instructions may be selected for dispatch along with a particular fast path instruction which is either immediately prior to or immediately subsequent to the MROM instruction in program order. If the MROM instruction is found to be a non-double-dispatch instruction, then either the MROM instruction or the particular fast path instruction is redispatched in a subsequent clock cycle (whichever instruction is second in program order). In order to handle the redispatch case, up to four instructions are selected during each clock cycle. From the selected set, instructions are selected for dispatch depending upon whether or not the first instruction in the set is indicated to be redispatched due to an MROM instruction in the prior clock cycle being detected as non-double-dispatch. Additional information regarding the packing mechanism may be found in the commonly assigned, copending patent application entitled "A Method for Concurrently Dispatching Microcode and Directly-Decoded Instructions in a Microprocessor" filed concurrently herewith by Narayan, et al. The disclosure of the referenced patent application is incorporated herein by reference in its entirety. It is noted that a similar mechanism may be used to pack fast path instructions with the last instructions from an MROM routine when the last instructions do not occupy all of the issue positions.

Figure 10:
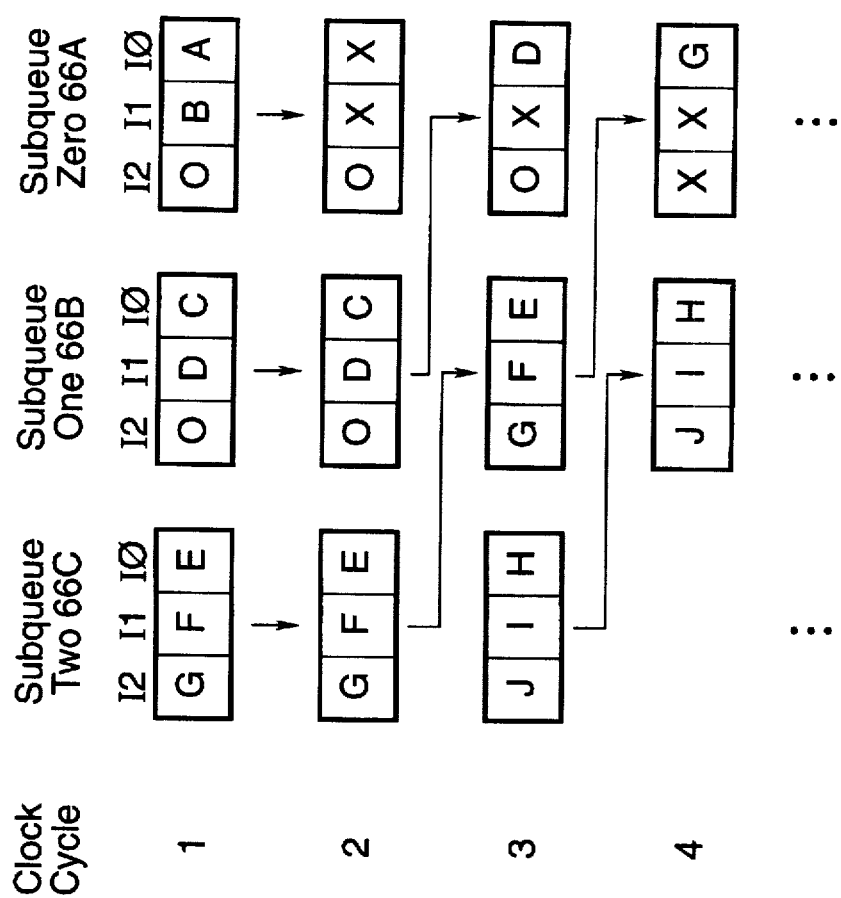
FIG. 10 is an exemplary flow of instruction blocks through one embodiment of the byte queue shown in FIG. 4.

Turning now to FIG. 10, an exemplary instruction flow through byte queue 54 is illustrated. Byte queue 54 is shown as first subqueue 66A, second subqueue 66B, and third subqueue 66C. Symbols "A" through "J" represent instructions, with the symbol "O" representing an overflowing instruction in position I2. Instruction A is prior to instruction B in program order, which is prior to instruction C in program order, etc. The symbol "X" is used to indicate an invalid instruction in a particular position. The flow of instructions are illustrated for a set of consecutive clock cycles 1, 2, and 3 as labeled along the left side of FIG. 10.

During clock cycle 1, first subqueue 66A stores fast path instructions A and B, and an overflowing instruction (which is also an MROM instruction in this example). Second subqueue 66B stores MROM instruction C (a portion of which is the overflowing instruction stored in first subqueue 66A), as well as fast path instructions D and an overflowing instruction. Finally, third subqueue 66C stores fast path instructions E (a portion of which is the overflowing instruction stored in second subqueue 66B), F, and G. Selection control unit 56 detects valid instructions in positions I0 and I1 of first subqueue 66A and position I0 of second subqueue 66B (with overflow bytes in first subqueue 66A). Normally, position I0 of first subqueue 66A would be dispatched into issue position zero, position I1 of first subqueue 66A would be dispatched in issue position one, and position I0 of second subqueue 66B would be dispatched into issue position two. However, instruction C (position I0 of second subqueue 66B) is an MROM instruction. Therefore, fast path instructions A and B are dispatched and instruction C is not dispatched. Because position I2 of first subqueue 66A is not storing overflow instruction information, position I2 is not shifted to position I0. Instead, valid indications of positions I0 and I1 of first subqueue 66A are invalidated. Because first subqueue 66A still contains valid instruction identification information, no subqueues are shifted into other subqueues during clock cycle 1.

Upon dispatch of instructions A and B, subqueues 66 transition to the state shown for clock cycle 2. During clock cycle 2, MROM instruction C is selected for issue. The overflow indication in first subqueue 66A is detected and appropriate bytes from first subqueue 66A are muxed along with the bytes identified by position I0 of second subqueue 66B. Because instruction C is an MROM instruction, no other instructions are selected for issue. Each of the instructions from first subqueue 66A have been selected for dispatch during clock cycle 2. Therefore, information from second subqueue 66B is shifted into first subqueue 66B. Similarly, information from third subqueue 66C is shifted into second subqueue 66B. Instruction C from second subqueue 66B was dispatched, so instruction D is shifted into queue position I0. Position I2 of second subqueue 66B is storing an overflowing instruction, and therefore is not shifted.

The transitions of clock cycle 2 are completed, creating the state shown in clock cycle 3. First subqueue 66A stores the instruction information formerly stored in second subqueue 66B, and second subqueue 66B stores the instructions formerly stored in third subqueue 66C. Third subqueue 66C has received a new instruction block including fast path instructions H, I, and J. During clock cycle 3, selection control unit 58 selects the instruction in position I0 of first subqueue 66A for issue position zero, position I0 of second subqueue 66B for issue position two, and position I1 of second subqueue 66B for issue position three. First subqueue 66A is again empty, and so the information in second subqueue 66B is shifted into first subqueue 66A and the information in third subqueue 66C is shifted into second subqueue 66B. Additionally, the positions within second subqueue 66B are shifted since instructions E and F have been dispatched. Therefore, first subqueue 66A stores instruction G in position I0, and invalid instructions in I1 and I2 during clock cycle 4. Second subqueue 66B stores instructions H, I, and J in positions I0, I1, and I2. Third subqueue 66C may receive a new instruction block (not shown).

Figure 11:
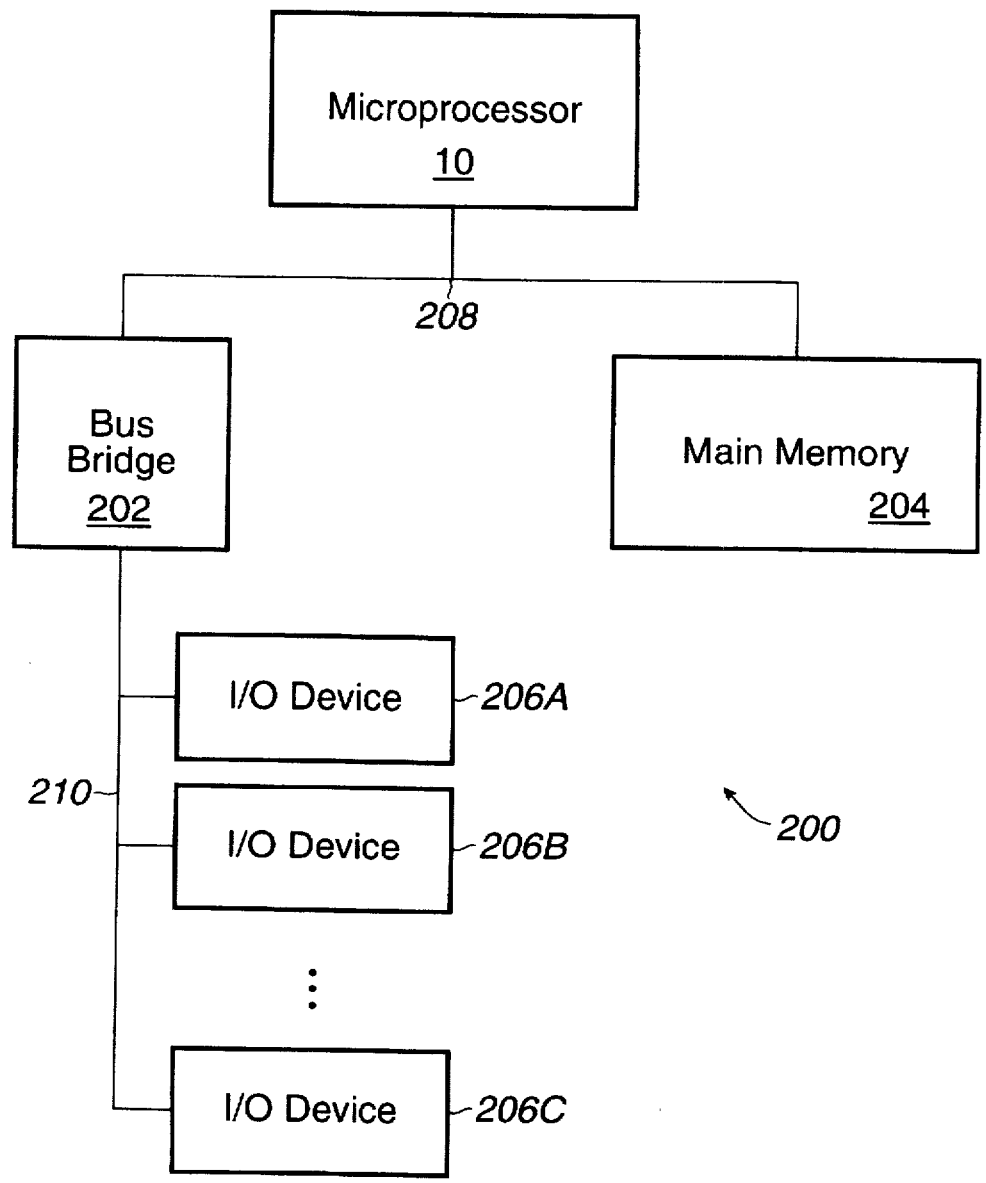
FIG. 11 is a block diagram of a computer system including the microprocessor shown in FIG. 1.

Turning now to FIG. 11, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 11 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is further noted that, although the x86 microprocessor architecture and instruction set is shown herein by way of example, the apparatus described may be employed by any microprocessor employing a variable byte length instruction set.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |

TABLE 1-continued x86 Fast Path, Double Dispatch, and MROM Instructions

| X86 Instruction | Instruction Category |
| --- | --- |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct 29, 1993 by Witt; "Superscalar Microprocessor Including a High Performance Instruction Alignment Unit", Ser. No. 08/377,843, filed Jan. 25, 1995 by Witt, et al; "A Way Prediction Structure", Ser. No. 08/522,181, filed Aug. 31, 1995 by Roberts, et al; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Narayan, et al. The disclosure of these patent applications are incorporated herein by reference in their entirety.

In accordance with the above disclosure, an apparatus for aligning variable byte length instructions to a plurality of issue positions has been described. The apparatus employs a byte queue having multiple independent subqueues. The subqueues internally shift instruction identification information upon dispatch of instructions, such that the instruction which is foremost in program order is stored within a particular position in any given clock cycle. Information is shifted from subqueue to subqueue when each of the instructions from a particular subqueue have been dispatched. Only information in a restricted number of positions need be examined to detect a first instruction for dispatch, a second instruction for dispatch, etc. Selection logic is accordingly reduced, allowing for higher operating frequencies in a microprocessor employing the apparatus.

Numerous variations and modifications will become apparent to those skilled in the art once the above disclosure is fully appreciated. It is intended that the following claims be interpreted to embrace all such variations and modifications.

What is claimed is:

1. An apparatus for aligning instructions to a plurality of issue positions, comprising:

a queue for storing instructions, said queue including:

a first portion configured to store a first block of instructions, wherein said first portion is further configured to store a first valid indication indicative of validity of a first instruction within said first block of instructions and a second valid indication indicative of validity of a second instruction within said first block of instructions, and wherein said second instruction is subsequent to said first instruction in program order;

a second portion configured to store a second block of instructions, wherein said second portion is further configured to store a third valid indication indicative of validity of a third instruction within said second block of instructions and a fourth valid indication indicative of validity of a fourth instruction within said second block of instructions, and wherein said fourth instruction is subsequent to said third instruction in program order;

a selection control unit coupled to said queue, wherein said selection control unit is configured to select a first dispatched instruction from said first instruction and said third instruction, and wherein said first dispatched instruction is dispatched to a first one of said plurality of issue positions, and wherein said first instruction is selected if said first valid indication indicates validity, and wherein said third instruction is selected if said first valid indication indicates invalidity and said third valid indication indicates validity; and a control unit coupled to said queue and to said selection control unit, wherein said control unit is configured to shift said second valid indication into said first valid indication if said first instruction is selected by said selection control unit, and wherein said control unit is configured to shift said second portion of said queue into said first portion of said queue if instructions within said first portion of said queue have been dispatched.

2. The apparatus as recited in claim 1 wherein said first portion is configured to store a first overflow indication indicating, when set, that at least one byte within said first block of instructions forms a portion of said third instruction.

3. The apparatus as recited in claim 2 wherein said selection control unit is further configured to examine said first overflow indication when selecting said first dispatched instruction.

4. The apparatus as recited in claim 3 wherein said first portion of said queue is further configured to store a first start indication identifying said byte within said first block of instructions.

5. The apparatus as recited in claim 4 wherein said selection control unit is configured to route said byte and additional bytes subsequent to said byte within said first block of instructions with said third instruction when said third instruction is selected for dispatch.

6. The apparatus as recited in claim 5 wherein said control unit is configured not to shift said second portion of said queue into said first portion of said queue if said first overflow indication is set unless said third instruction is selected for dispatch.

7. The apparatus as recited in claim 1 wherein said selection control unit is configured to select a second dispatched instruction for dispatch to a second one of said plurality of issue positions.

8. The apparatus as recited in claim 7 wherein said selection control unit is configured to select said second dispatched instruction from said second instruction, said third instruction, and said fourth instruction.

9. The apparatus as recited in claim 8 wherein said first portion of said queue is further configured to store a fifth valid indication indicative of validity of a fifth instruction subsequent to said second instruction and prior to said third instruction in program order, and wherein said fifth instruction is included within said first block of instructions.

10. The apparatus as recited in claim 9 wherein said control unit is configured to shift said fifth valid indication into said second valid indication if said first instruction is selected for dispatch and said second valid instruction is not selected for dispatch.

11. The apparatus as recited in claim 9 wherein said control unit is configured to shift said fifth valid indication into said first valid indication if said first instruction is selected for dispatch and said second valid instruction is selected for dispatch.

12. The apparatus as recited in claim 1 wherein said queue includes a third portion configured to store a third block of instructions, wherein said third portion is configured to store a sixth valid indication indicative of validity of a sixth instruction within said third plurality of instruction bytes and a seventh valid indication indicative of validity of a seventh instruction within said third plurality of instruction bytes.

13. The apparatus as recited in claim 12 wherein said control unit is configured to shift said third portion into said second portion if said second portion is being shifted into said first portion.

14. The apparatus as recited in claim 12 wherein said selection control unit is configured to select said first dispatched instruction as said sixth instruction if said sixth valid indication indicates validity, said first valid indication indicates invalidity, and said third valid indication indicates invalidity.

15. The apparatus as recited in claim 1 wherein said first block of instructions and said second block of instructions are a same block of instruction if said same block of instructions includes said first instruction, said second instruction, and said third instruction.

16. A method of aligning instructions to a plurality of issue positions, comprising:

storing a first instruction block in a first portion of a queue, said first portion of said queue further storing a first valid indication indicative of validity of a first instruction within said first instruction block and a second valid indication indicative of validity of a second instruction within said first instruction block;

storing a second instruction block in a second portion of a queue, said second portion of said queue further storing a third valid indication indicative of validity of a third instruction within said second instruction block and a fourth valid indication indicative of validity of a fourth instruction within said second instruction block;

dispatching a first dispatched instruction to a first one of said plurality of issue positions, wherein said first dispatched instruction is selected from said first instruction and said third instruction according to said first valid indication and said third valid indication;

shifting said second valid indication into said first valid indication if said first instruction is selected as said first dispatched instruction; and shifting said second portion of said queue into said first portion of said queue if said first instruction and said second instruction have been dispatched.

17. The method as recited in claim 16 wherein said first portion of said queue is further configured to store a first overflow indication indicative that at least one byte within said first instruction block is included within said third instruction.

18. The method as recited in claim 17 wherein said second portion of said queue is not shifted into said first portion of said queue if said first overflow indication is set, unless said third instruction is selected for dispatch to one of said plurality of issue positions.

19. The method as recited in claim 16 wherein said first instruction block and said second instruction block comprise a same instruction block if said same instruction block includes said first instruction, said second instruction, and said third instruction.

20. A microprocessor, comprising:

an instruction cache configured to store a first block of instructions and a second block of instructions subsequent to said first block of instructions in program order;

a queue coupled to receive said first block of instructions and said second block of instructions from said instruction cache, wherein said queue including:

a first portion configured to store said first block of instructions, wherein said first portion is further configured to store a first valid indication indicative of validity of a first instruction within said first block of instructions and a second valid indication indicative of validity of a second instruction within said first block of instructions, and wherein said second instruction is subsequent to said first instruction in program order;

a second portion configured to store said second block of instructions, wherein said second portion is further configured to store a third valid indication indicative of validity of a third instruction within said second block of instructions and a fourth valid indication indicative of validity of a fourth instruction within said second block of instructions, and wherein said fourth instruction is subsequent to said third instruction in program order;

a selection control unit coupled to said queue, wherein said selection control unit is configured to select a first dispatched instruction from said first instruction and said third instruction according to said first valid indication and said third valid indication; and a control unit coupled to said queue and to said selection control unit, wherein said control unit is configured to shift said second valid indication into said first valid indication if said first instruction is selected by said selection control unit, and wherein said control unit is configured to shift said second portion of said queue into said first portion of said queue if instructions within said first portion of said queue have been dispatched.

* * * * *